(12) United States Patent
Wexler et al.

(10) Patent No.: US 6,298,357 B1
(45) Date of Patent: Oct. 2, 2001

(54) STRUCTURE EXTRACTION ON ELECTRONIC DOCUMENTS

(75) Inventors: Michael C. Wexler, Santa Clara; Jeffrey E. Young, San Jose, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 08/868,450

(22) Filed: Jun. 3, 1997

(51) Int. Cl.[7] ....................................... G06F 15/00
(52) U.S. Cl. .................. 707/513; 707/514; 707/526
(58) Field of Search .................. 707/513, 514, 707/515, 526

(56) References Cited

U.S. PATENT DOCUMENTS

| | | | |
|---|---|---|---|
| 5,130,924 | * | 7/1992 | Barker et al. ............... 707/509 |
| 5,146,552 | * | 9/1992 | Cassorla et al. ............. 395/145 |
| 5,181,162 | * | 1/1993 | Smith et al. ................ 364/419 |
| 5,434,962 | * | 7/1995 | Kyojima et al. ............. 395/145 |
| 5,557,722 | * | 9/1996 | DeRose et al. .............. 395/148 |
| 5,568,640 | * | 10/1996 | Nishiyama et al. ........... 395/600 |
| 5,634,064 | * | 5/1997 | Warnock et al. ............. 707/513 |
| 5,694,609 | * | 12/1997 | Murata ..................... 395/774 |
| 5,701,500 | * | 12/1997 | Ikeo et al. ................ 707/517 |
| 5,708,806 | * | 1/1998 | DeRose et al. .............. 395/615 |
| 5,737,599 | * | 4/1998 | Rowe et al. ................ 707/104 |
| 5,781,785 | * | 4/1999 | Rowe et al. ................ 707/513 |
| 5,946,647 | * | 8/1999 | Miller et al. .............. 704/9 |

\* cited by examiner

*Primary Examiner*—Heather R. Herndon
*Assistant Examiner*—Cong-Lac Huynh
(74) *Attorney, Agent, or Firm*—Fish & Richardson P.C.

(57) ABSTRACT

A method and apparatus for extracting structure information from an unstructured electronic document is described. The method includes the step of identifying a structural type for each instance in the electronic document by examining presentation attributes associated with each instance. Examples of presentation attributes which are examined include numbering formats, indentations, and font sizes and weights.

20 Claims, 10 Drawing Sheets

FIG. 2
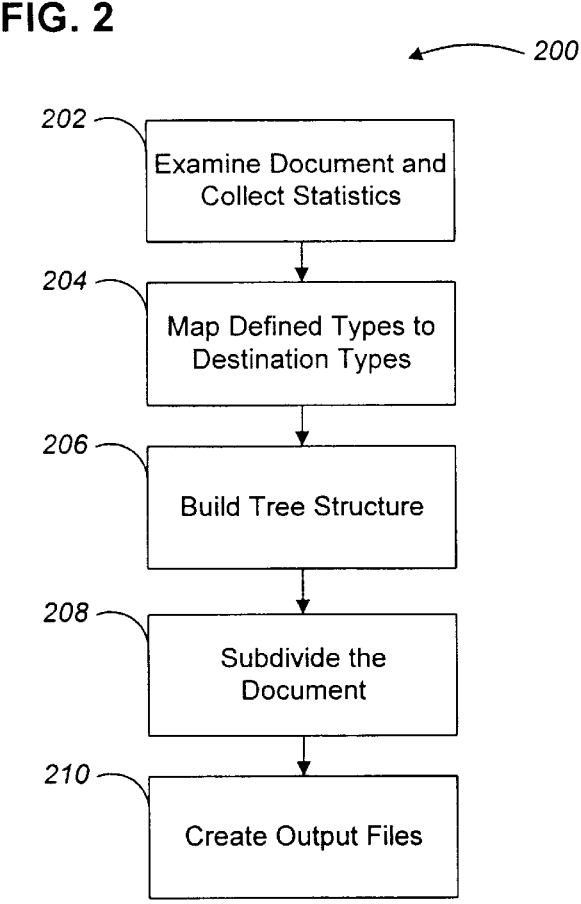
FIG. 2a
| Source Tag | Destination Tag | Split Node |
|---|---|---|
| STag1 | DTag1 | Yes |
| STag2 | DTag1 | Yes |
| STag3 | DTag4 | No |
| STag4 | DTag5 | No |
FIG. 3
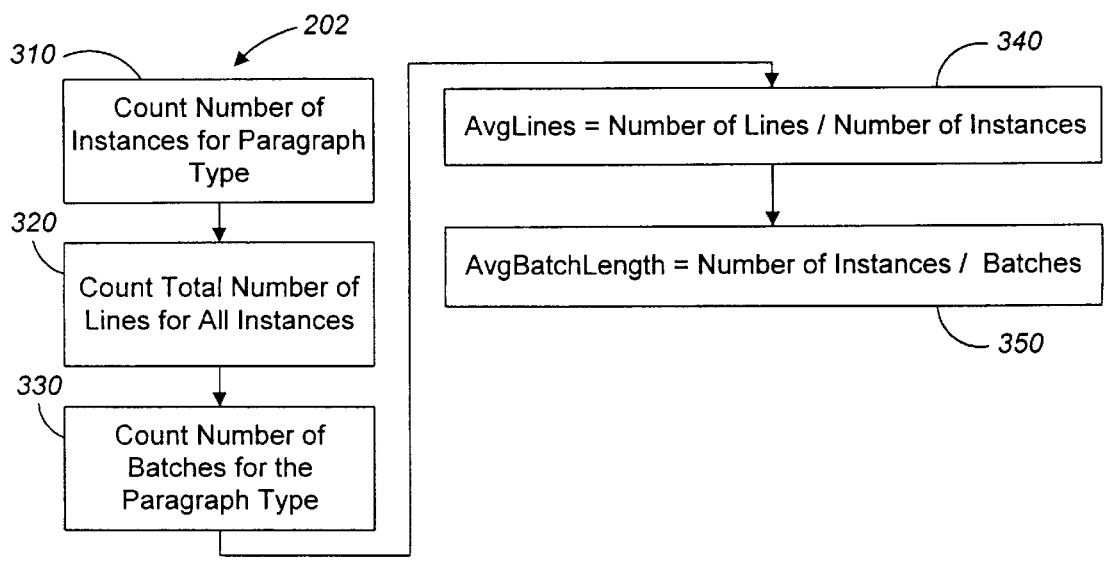

FIG. 7a

| Heading | Level |
|---|---|
| Heading 1 | 1 |
| Heading 2 | 1 |
| Heading 3 | 2 |
| Heading 4 | 3 |
| Heading 5 | 1 |

| Source Filename | Location | Pointer to Node |
|---|---|---|
| File1 | A | 804a |
| File1 | B | 804b |
| File2 | C | 806b |
| File2 | D | 806h |

STRUCTURE EXTRACTION ON ELECTRONIC DOCUMENTS

BACKGROUND OF THE INVENTION

The present invention relates to techniques that identify and categorize paragraphs, subparagraphs, and structural groupings in electronic documents, and more particularly to techniques that build a structure hierarchy from structural groupings.

An electronic document typically has information content, such as text, graphics, and tables, and formatting information that directs how the content is to be displayed. An electronic document resides on a digital, though not necessarily electronic, computer storage medium. An electronic document is generally provided by an author, distributor, or publisher who desires that the document be viewed with the appearance with which it was created. Electronic documents may be widely distributed and, therefore, can be viewed on a great variety of hardware and software platforms. A hypertext document is an electronic document with links, which are explicit, user-selectable navigation elements.

Generally, electronic and human perceptible documents include a set of paragraphs. Each instance of a paragraph shares characteristics with other paragraphs. Paragraphs that share visual characteristics can be considered the same structural type. Examples of structural paragraph types are titles, headers, and footnotes.

In addition, in all documents, paragraphs can have subparagraphs, which are character streams. Each instance of a subparagraph shares similar characteristics with other subparagraphs that are the same structural type. Examples of subparagraph structural types are book titles, quotations, and foreign words and phrases.

A document typically has a logical organization. Within the logical organization are identifiable structural groups. A series of chapters containing paragraphs is an example of a structural group, as is a section that contains a heading, several paragraphs, and a bulleted list.

Organizing components in an electronic document by structural type permits an electronic document development system to perform global operations on all instances of the same type within the electronic document. For example, the FrameMaker® document publishing system, available from Adobe Systems Incorporated of San Jose, Calif. can globally change the justification of all paragraphs tagged as a particular type in the electronic document and can globally change the font size of all characters tagged as a particular type in the electronic document.

Standard type formats exist for particular uses and for particular systems. For example, the HyperText Markup Language (HTML) uses the embedded tags <P> and </P> to delimit paragraphs, and <B> and </B> to delimit bold text. HTML also specifies many other tags including tags for titles, menus, definitions, quoted blocks, and heading styles. For an electronic document to have the desired visual appearance when viewed with a World Wide Web browser, the electronic document must have the appropriate HTML tags.

When viewed on paper or on a computer display, the different structural paragraph types in a document, such as headings and lists, are readily identifiable. However, to enable a system to perform operations based on structural types, such as modifying, rearranging, displaying, or printing a document, will generally require that someone examine and tag all paragraphs and subparagraphs manually according to their visually recognized structural type. This is tedious and time consuming, and often an impracticable process for large documents.

SUMMARY OF THE INVENTION

In accordance with the present invention, a method of extracting structure information from an electronic document includes the step of identifying a structure type for each instance in the electronic document by examining presentation attributes associated with each instance. With such an arrangement, an unstructured electronic document can be provided with structural tags.

Among the advantages of the invention are one or more of the following. The invention enables an electronic document development system to perform global operations on all paragraph and subparagraph instances by structural type. Global operations include, but are not limited to, format changes, searches, word and phrase replacements, and extractions. The invention enables the electronic document development system to perform operations on the structure of the electronic document (e.g., rearrange the hierarchy or subdivide the structure). The invention permits an electronic document to be rearranged or divided according to structural groupings of the document. The invention enables an electronic document to be rearranged based on full sections and identifiable units. The invention enables the document to be split based on logical organization.

Other features and advantages of the invention will become apparent from the following description and from the claims.

BRIEF DESCRIPTION OF THE DRAWINGS

FIG. 2 is a flow chart of a method for converting and dividing an electronic document for use by another documentation system;

FIG. 2a is an example of a table that maps source to destination tags;

FIG. 3 is a flow chart of a method that gathers statistical information about an electronic document for use in the method of FIG. 2;

FIG. 7a is a table that contains heading levels;

DESCRIPTION OF THE PREFERRED EMBODIMENTS

Figure 1:
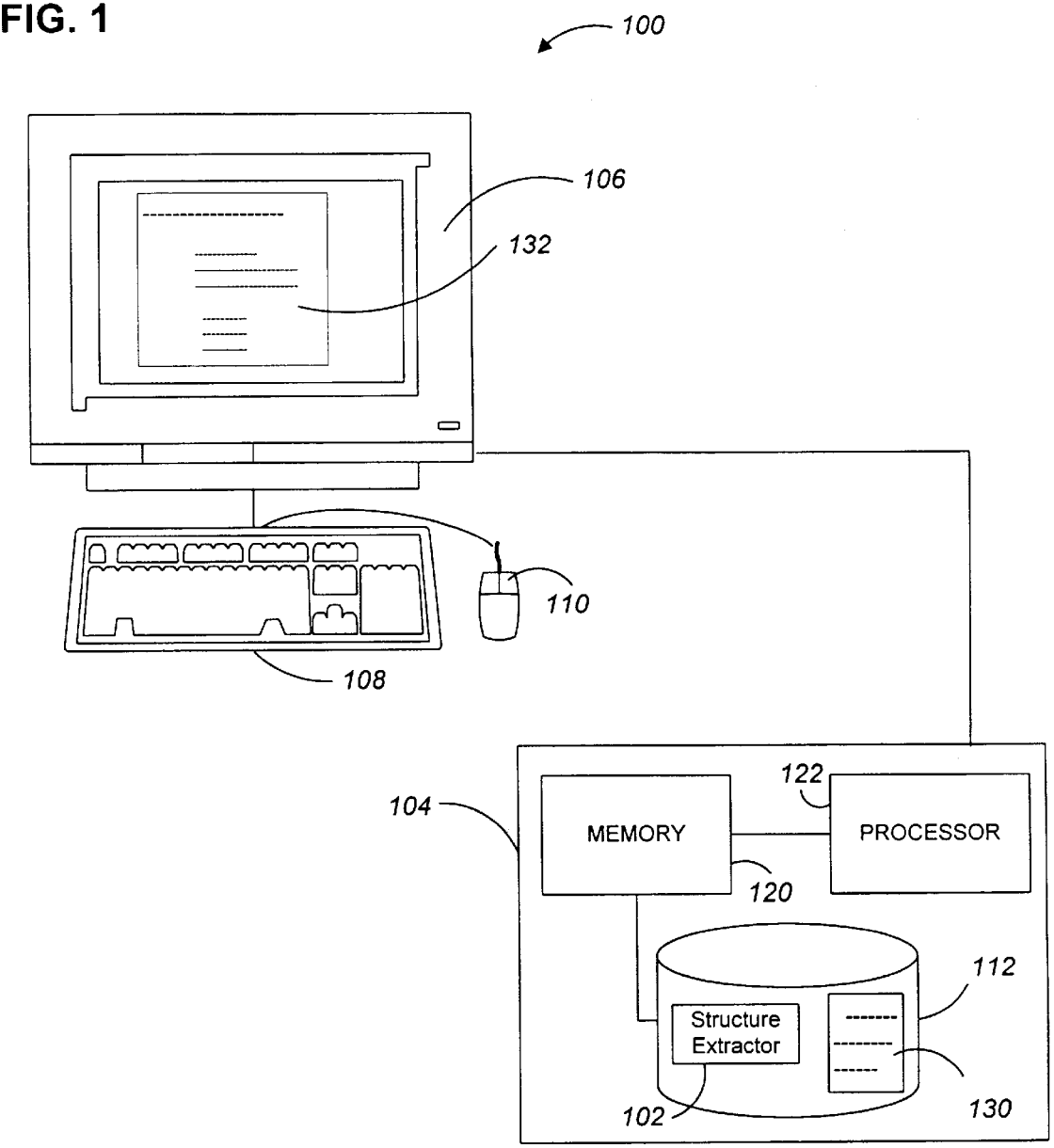
FIG. 1 is a schematic diagram of a computer platform suitable for supporting a structural extractor system in accordance with the present invention.

Referring to FIG. 1, a general purpose computer platform 100 suitable for supporting an electronic document development system and including a structural extractor 102 is shown. The platform (e.g., a personal computer or workstation) includes a digital computer 104, a display 106, a keyboard 108, a mouse 110 or other pointing device, and a mass storage device 112 (e.g., hard disk drive, magneto-optical disk drive, or floppy disk drive). The computer 104 is of conventional construction and includes memory 120, a processor 122, and other customary components (e.g., memory bus and peripheral bus).

An electronic document 130 stores information on a hard disk or other computer readable medium such as a diskette. An electronic document is viewable in a human perceptible representation on a computer display 132 or as a hardcopy printout through operation of a computer program.

A system capable of converting presentational attribute information in a source electronic document to a predetermined set of structural types in a destination electronic document would eliminate human intervention in the conversion process. Furthermore, such a system is useful for structuring a document as a structural tree hierarchy. Such a system would need to identify and map standard and user-defined types in the source electronic document to appropriate structural types in the destination electronic document.

Other processes that typically requires human intervention are rearranging parts of an electronic document and dividing an electronic document into electronic sub-documents. A system capable of identifying logical breaks, for example, at the beginning of a chapter or a section, can automate the rearrangement and division processes. Such automated processes must maintain links (e.g., hypertext links) to other components in the electronic document.

Referring to FIG. 2, a system 200 that identifies formatting styles or types received as input a source electronic document and outputs one or more electronic documents with structural types recognizable by a destination system. The destination system may be the same or a different system than the source system. The system examines an electronic document and collects statistics about the paragraph instances in the electronic document (step 202). Using this information, if the source electronic document has original presentational attribute information in the form of a named type, the system creates a tag table, having at least two-columns as shown in FIG. 2a, mapping each original paragraph type in the source electronic document to the structural type for the destination system (step 204). The tag table can contain information that indicates if a paragraph having that type can separate from the electronic document.

Structural types serve as a basis for building a tree structure (step 206) that represents the structural organization of instances in the electronic document. The system can optionally divide the electronic document into subdocuments (step 208). Smaller files are easier to download and view using a World Wide Web browser, for example. The system also can create output files (step 210) with structural type tags that the destination system will recognize.

Referring to FIG. 3, the system gathers statistics on each paragraph. The system can gather statistics while reading the source electronic document during one or more passes. Statistics include the number of instances of each original paragraph type (step 310), the total number of lines for all instances having the same paragraph type (step 320), and the number of groups of consecutive instances of a particular type (step 330). Each group of consecutive instances of the original type is referred to as a batch. From these statistics, the system computes the average number of lines for all the instances for each original paragraph type (step 340). The system also computes the average batch-length for an original paragraph type by dividing the number of instances of the same type by the number of batches of that type (step 350). These statistics are used in conjunction with the method described in reference to FIG. 5.

A checklist containing factors is used to map paragraph and subparagraph types in a source electronic document to structural types in a destination electronic document. One factor is the combination of existing style settings, such as relative character weights, relative font sizes, italic characters, and indentations. Other factors include the placement of paragraphs and subparagraphs in relationship to other paragraphs and subparagraphs, numbering schemes, and repetitive structures (e.g., bulleted lists).

The system maps each source type to a destination type. A mapping between types can occur although the source type does not have all characteristics of a destination type. However, the more characteristics present, the higher the probability that the source type is a specific destination type.

Figure 4:
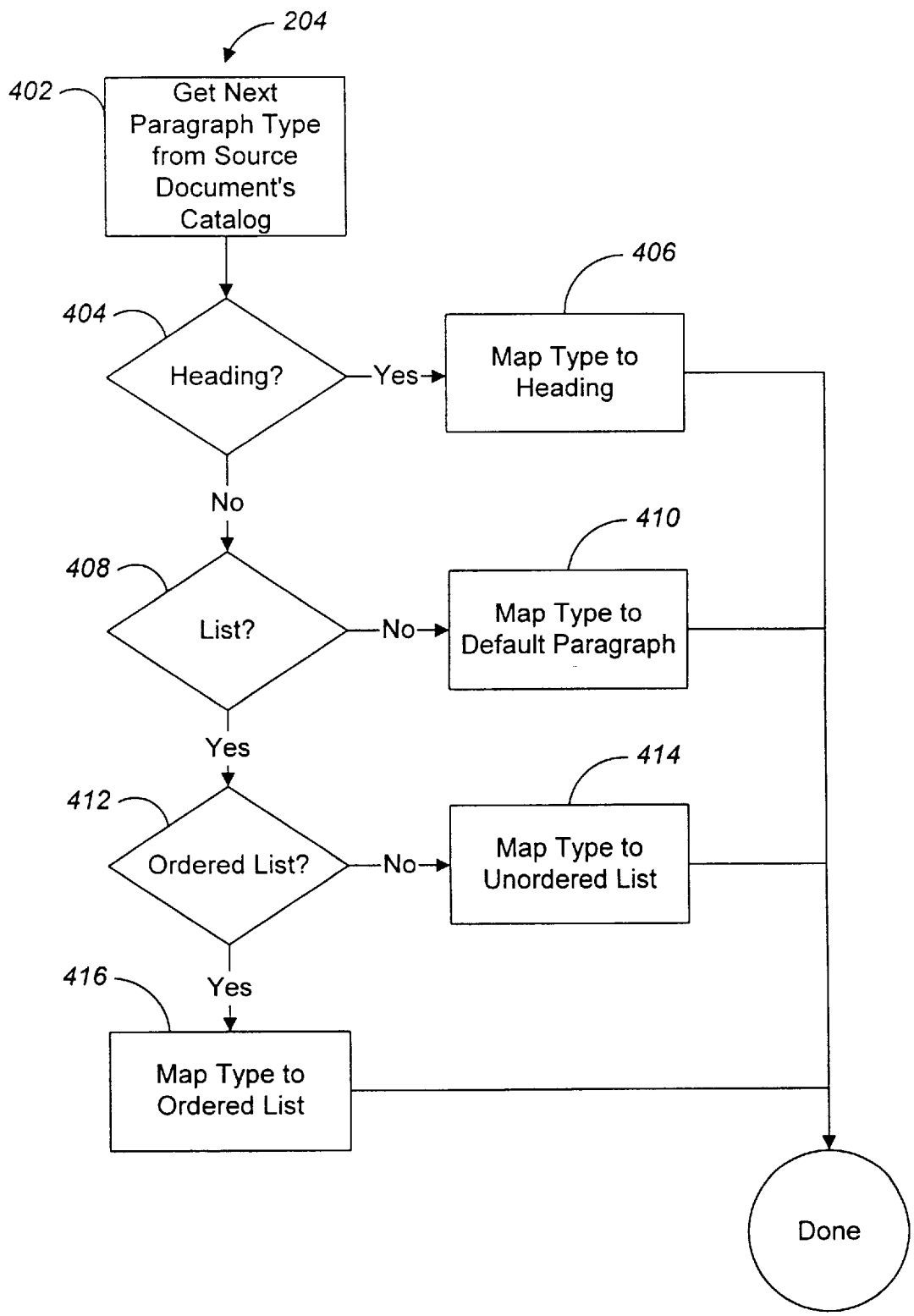
FIG. 4 is a flow chart of a method for mapping presentational attributes in a document to structural types useful for the method of FIG. 2.

Referring to FIG. 4, the steps used to map paragraph presentational attribute types in the source system to structural paragraph types in the destination system are shown. The system gets the next original paragraph type from a catalog that defines all original paragraph types for the electronic document (step 402). The system determines whether the paragraph type is a heading (step 404) or a list element (step 408). If the paragraph is neither, the system identifies it as a default paragraph type (step 410). Before mapping a type to a default paragraph (step 410), the system can perform additional tests to determine whether the paragraph is a footnote, bibliographic element, quoted passage, and so forth.

To determine if the paragraph structural type is a list, the system checks whether the paragraph has an automatically generated prefix, which indicates that the paragraph is an ordered list. In a FrameMaker source document, for example, if a format contains the characters "<" and ">", the system tags the paragraph as an ordered list (step 416). These characters enclose a code that specifies a quantity, such as a number, that varies for each instance. Otherwise, the system identifies the structural paragraph type as an unordered list (step 414).

Figure 5:
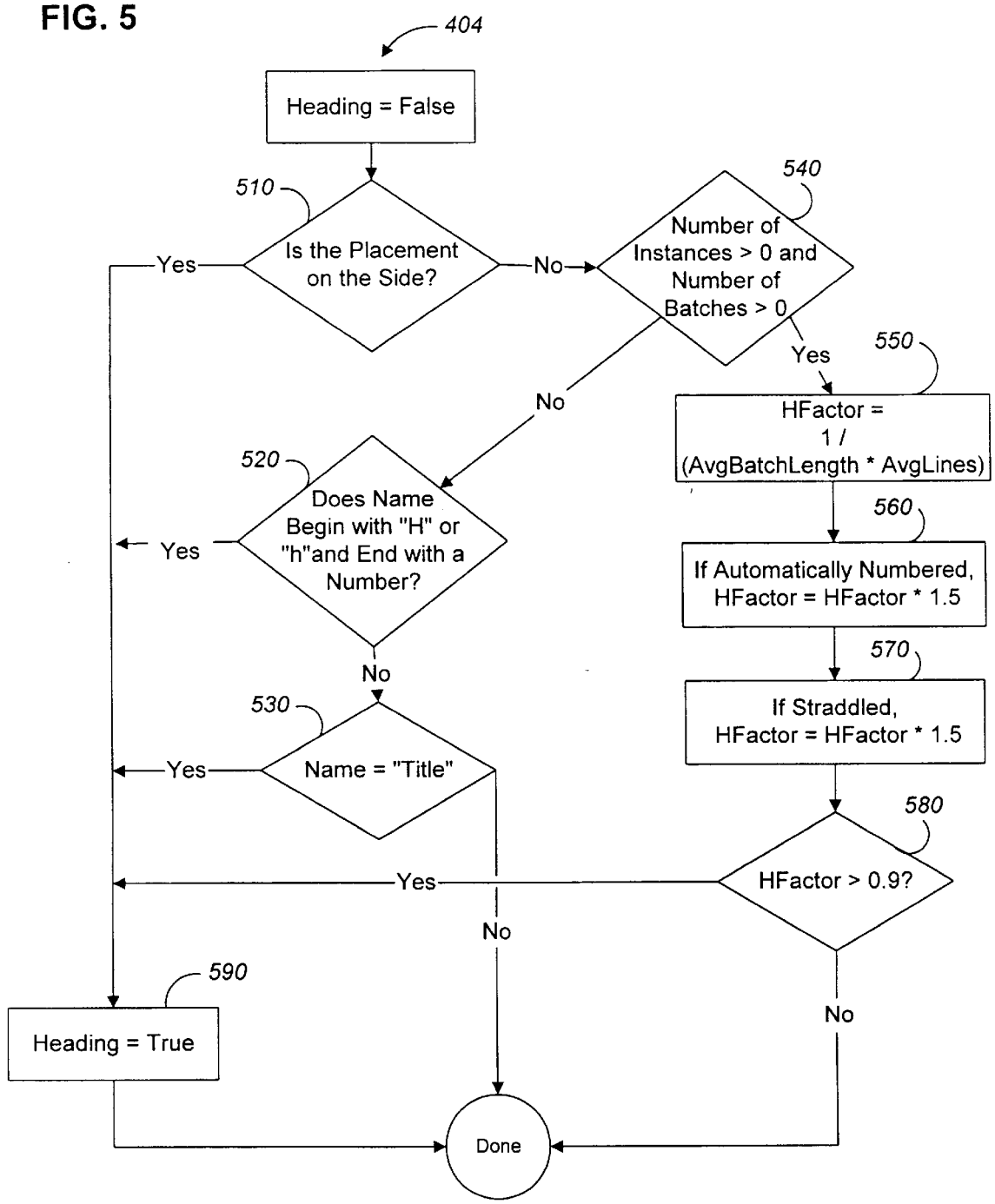
FIG. 5 is a flow chart of a method for determining whether a paragraph is a heading.

Referring to FIG. 5, the system considers a number of factors to determine if the structural paragraph type is a heading. The system checks the placement of the paragraph (step 510) and if the placement is on the side of a page within an area predominated by white space, the original paragraph type maps to a heading (step 590). If the name of the paragraph type begins with the letter "H" or "h", and ends with a number (step 520), the paragraph type maps to a heading (step 590). If the name of the paragraph type is "Title" (step 530), the paragraph type maps to a heading (step 590). If the paragraph type has at least one instance and there is at least one batch (step 540), the system uses the statistics gathered to create a weighting factor. This factor is the inverse of the average batch-length multiplied by the average number of lines (step 550). If the paragraph type is automatically numbered, this weighting factor is multiplied by the empirical constant 1.5 (step 560). If the paragraph type is straddled (i.e., spans across multiple columns), the weighting factor is multiplied by the empirical constant 1.5 (step 570). If the paragraph type is automatically numbered and is straddled, the weighting factor increases twice. The system compares the weighting factor to the constant 0.9 (step 580) and if the weighting factor is greater, the paragraph type is classified as a heading (step 590). As the system assigns headings, it builds a heading table listing each heading type, as shown in FIG. 7a.

After classifying all original paragraph types defined in the paragraph catalog, the system considers all original subparagraph types defined in the character catalog. In one embodiment, all character types are mapped to a default character tag recognized by the destination system. However, other embodiments may consider factors such as bounding entities (e.g., quotation marks, underlines, and parentheses), bold text, italics, and highlighting techniques.

For paragraphs and subparagraphs that do not have tags, the system can analyze untagged paragraphs and subparagraphs, and assign appropriate tags. For example, a series of one-line numbered paragraphs may be tagged as an ordered list, or a quoted series of characters may be tagged as a quoted passage.

Figure 6:
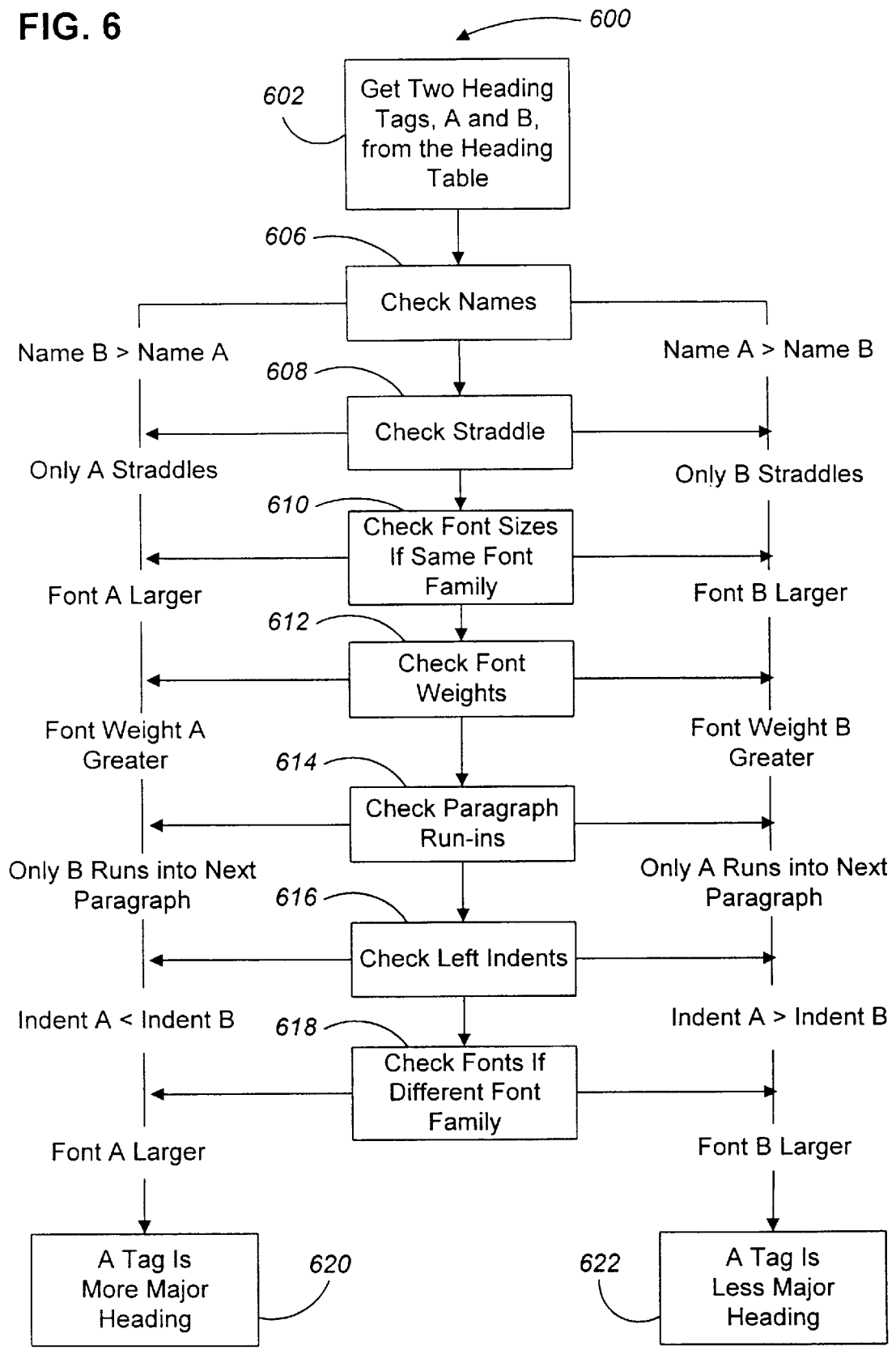
FIG. 6 is a flow chart of a method that sorts heading types.

Prior to building a tree structure (step 206) that represents the hierarchical organization of instances in the document, the system assigns a level to each structural paragraph type. An ordinary paragraph is assigned a level of 0. Heading and list types are assigned levels using a sorting technique. The system may use any sorting technique, for example, a bubble sort, quick sort, or insertion sort, using the comparison technique as shown in FIG. 6. The comparison technique selects two items at a time from a heading table, as shown in FIG. 7a, compares the two items, and assigns each a level. The sorting technique makes additional passes until all items are ordered and assigned the appropriate level.

As shown in FIG. 6, the technique that compares headings checks several attributes for two heading types, A and B. The system gets two tags from the heading mapping table (step 602), and first checks the names of the heading tags (step 606).

Figure 7:
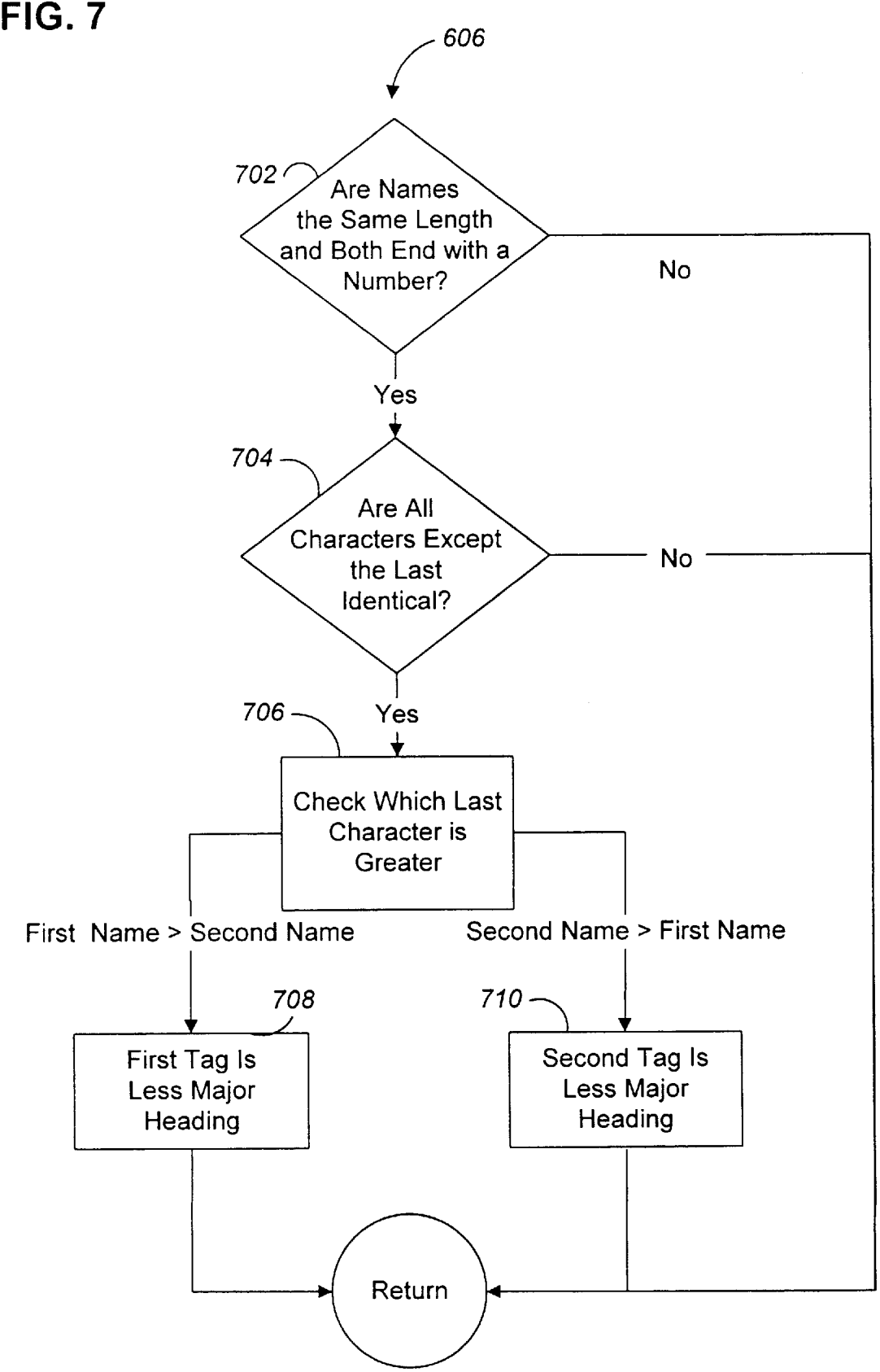
FIG. 7 is a flow chart of a method that sorts headings according to name.

Referring to FIG. 7, exemplary steps for comparing names are shown. If the heading names are similar, the headings may be different levels. The system checks whether name A and name B have the same number of characters and end with a number (step 702). If all characters except the last are identical (step 704), the last character in name A and the last character in name B are compared (step 706). The heading with the greater number is deemed the lesser heading (step 708 and step 710). The system enters the level into the heading table, as shown in FIG. 7a. The lower the heading number, the closer the level is to the root in the tree structure. For example, the system assigns a lower level to a heading named Heading2 than a heading named Heading1, and Heading1 is closer to the root node.

Examples of other presentational attributes that the system checks, as shown in FIG. 6, are whether a heading straddles columns (step 608), the font sizes (step 610) and font weights (step 612) if the font is the same family, whether a paragraph adjoins (i.e., runs into) the following paragraph (step 614), the indentations (step 616), and the font sizes and weights from different font families (step 618). The system checks attributes with greater weights first. The result of the comparison is that the A heading is more major (step 620) or the B heading is more major (step 622).

The system assigns levels to list types in a similar manner as it assigns levels to heading types. It uses a sorting technique that compares names, numbering formats, indentations, and font sizes and weights. The system can include additional comparisons during the sort for other paragraph characteristics.

Figure 8:
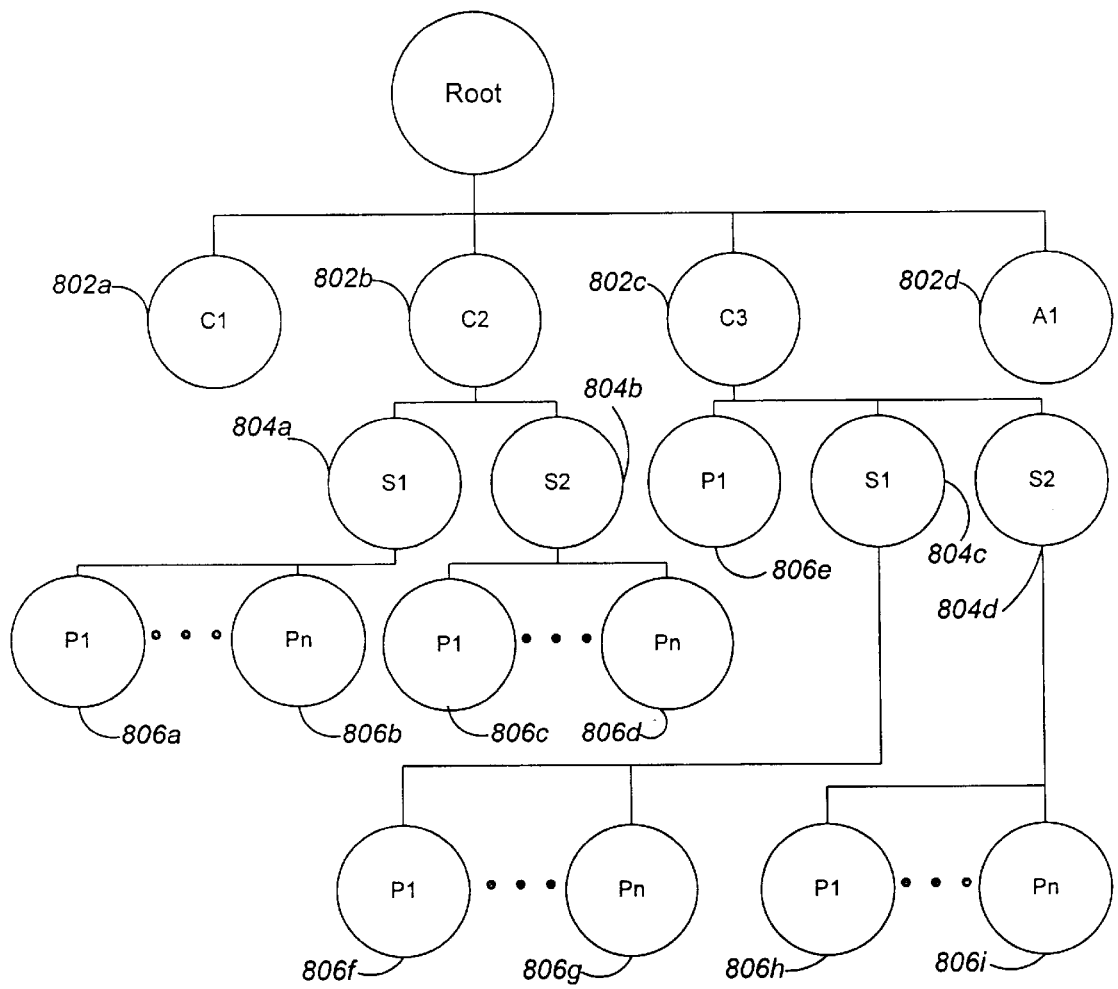
FIG. 8 is a diagram that shows a hierarchy of instances in a document.

Referring to FIG. 8, a hierarchical structure represents structural groups of paragraph instances in a document, where each instance is represented by a node in the hierarchy. The system arranges the nodes according to the logical flow of the document. For example, a document may have four segments organized as chapters 802a–c and an appendix 802d, two of which have sections 804a–d. Each section may have one or more paragraphs 806a–i.

Figures 9, 9A:
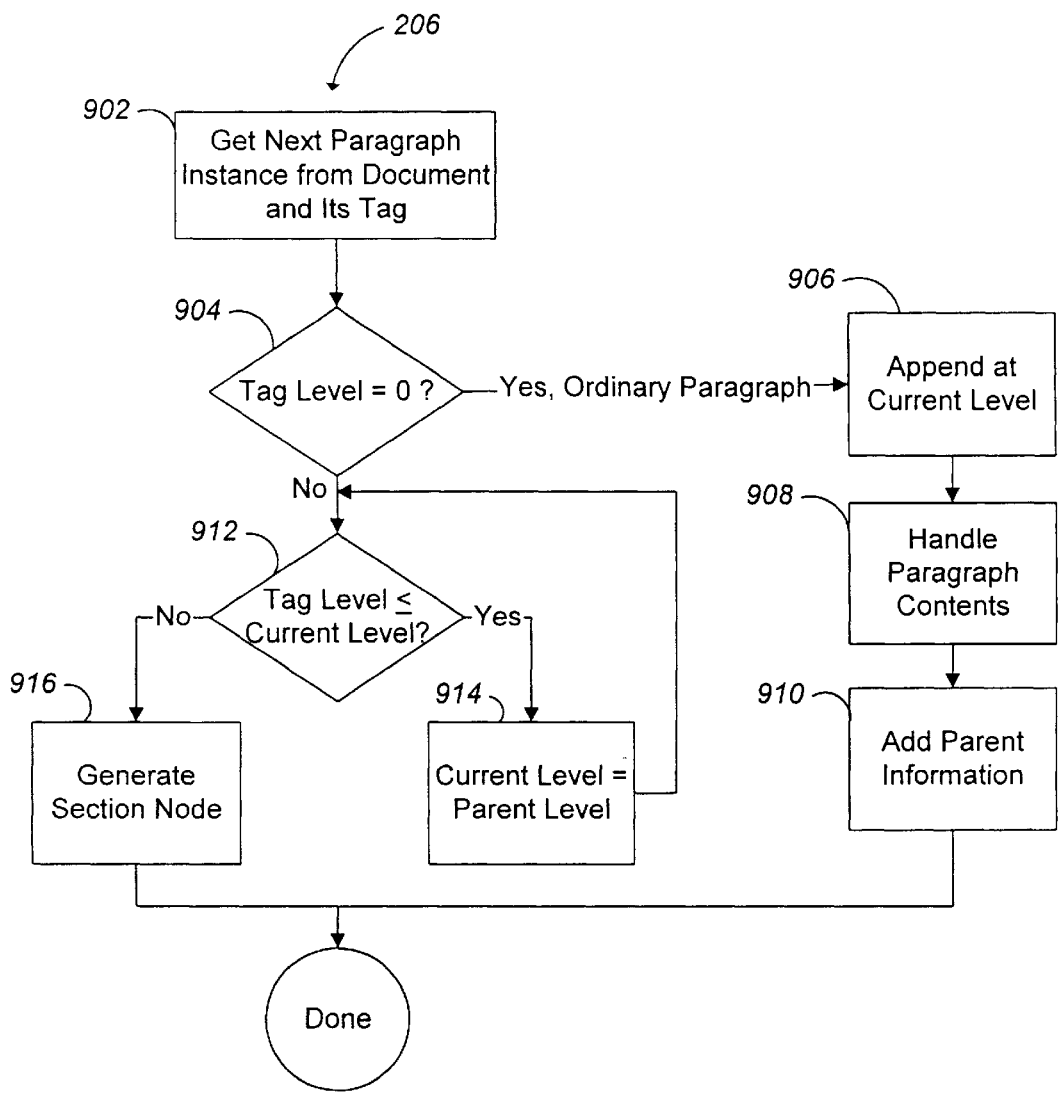
FIG. 9 is a flow chart of a method that builds a hierarchical tree structure for an electronic document.
FIG. 9a is a table that maps a link in a source electronic document to a destination electronic document.

As shown in FIG. 9, the system begins to build a structured representation of a document by reading an unstructured electronic document one paragraph at a time and getting the tag for the paragraph (step 902). Each tag has a tag level that was assigned during the sorting phase, and entered into a table such as shown in FIG. 7a. If the tag level is zero (step 904), the paragraph is an ordinary paragraph. In this case, the system appends the paragraph at the current level (step 906). The system handles the paragraph contents (step 908) as terminal nodes. The contents include characters and links. A link causes the system to add link information to a link destination table, as shown in FIG. 9a, which is a table created during this tree-building phase. The link destination table includes a source electronic document identifier, an internal location of the link in the source and destination electronic documents, and a pointer to a node in the tree structure.

If the tag level is not zero, the paragraph creates a section node, which represents a branch such as a heading or beginning of a list. If the tag level is less than or equal to the current level, the system walks up the tree (step 914) until the tag level is greater than the current level. The system generates a section node at this level (step 916). The section node begins a new branch of the tree. The node is identified as a section node and the contents of the paragraph are the first children of the node (e.g., the heading text).

A hierarchical organization enables the system to rearrange sections and divide an electronic document into subfiles at specified branches in the tree structure. Furthermore, a hierarchical organization provides a means for identifying structural groups as branches of a tree. Branches may represent lists, chapters, sections, subsections, and footnotes. A document development system can also display the structural organization of an electronic document and allow users to specify portions of the electronic document as targets for specific operations. Such operations may include format changes, searches, word and phrase replacements, and extractions on all instances in one or more structural groups.

The system creates destination electronic documents by writing the paragraph instances to files according to the tree structure. The system walks the tree structure and writes the contents of each node, along with the appropriate tags to the file associated with the node.

Figure 10:
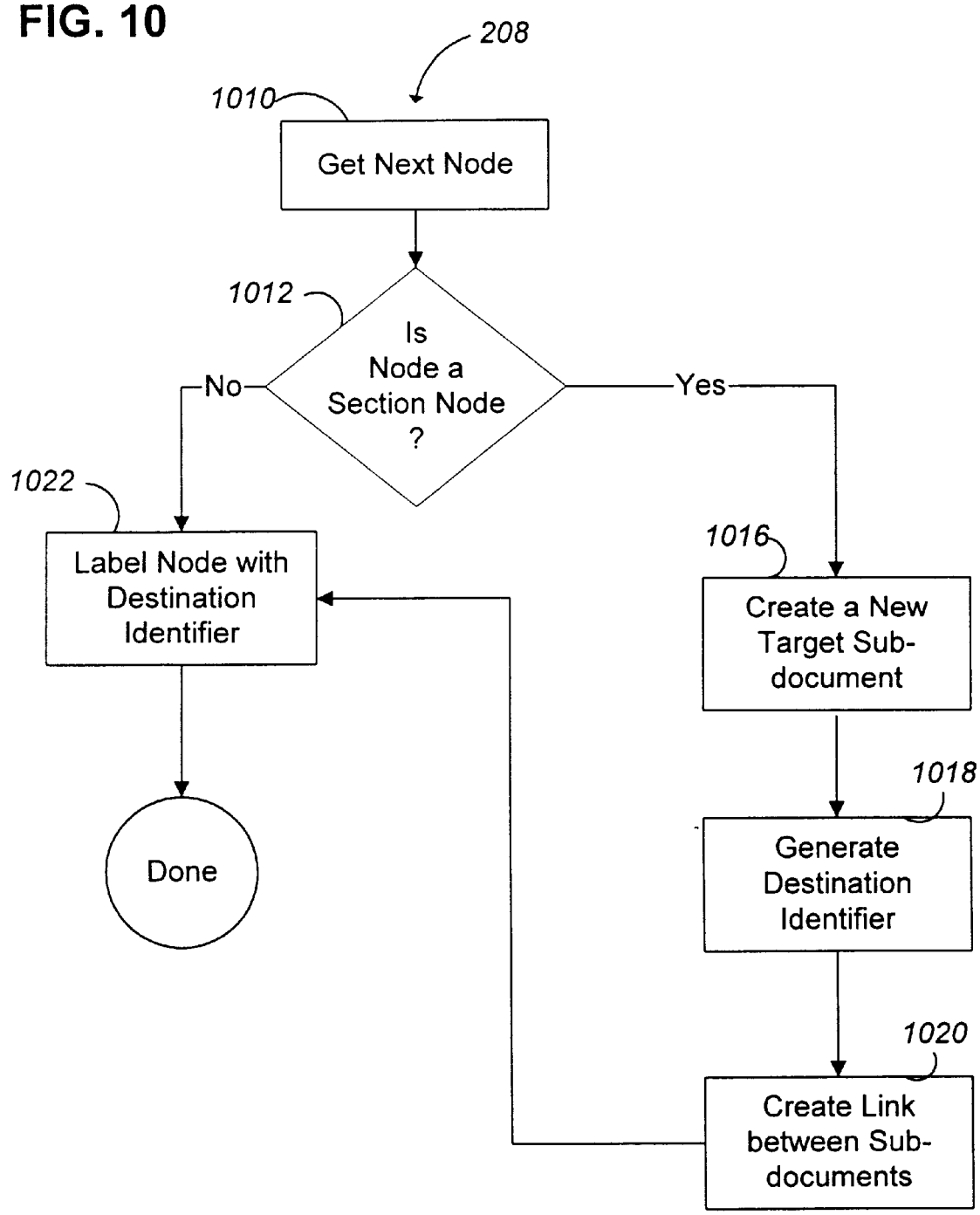
FIG. 10 is a flowchart that shows a method that divides a tree structure into subdocuments.

Section nodes represent paragraph instances where the system can divide or rearrange the electronic document. Using the heading table, as shown in FIG. 7a, specific nodes are identified as nodes where the system can split the tree. In one embodiment, a tree structure may be subdivided at every branch, as shown in FIG. 10. To divide a structured electronic document in this way, the system traverses the tree, node by node (step 1010). The system checks for section nodes (step 1012). If the node is a section node, the system creates a new electronic sub-document (step 1016) and generates a destination identifier (step 1018) that is entered in the link destination table, as shown in FIG. 9a. The electronic sub-documents, except the first, have links from the parent electronic sub-document (step 1020). The link creates a natural flow from one electronic sub-document to the next, for example, the link may be used as a hypertext link. For each node, the system labels the node with a destination identifier (steps 1022).

The system provides several ways for dividing an electronic document. The system can divide the electronic document at pre-defined levels. Levels can be designated by a user manually. Levels can be determined by pre-defined or automatically determined size limitations.

A number of user interface techniques can be used to divide or rearrange a document. The system can display the tree structure in a user interface. A user can use a pointing device, such as a mouse, to specify areas in the tree to move or specify where the system should divide the electronic document.

When a file is rearranged or divided, the system maintains all internal and external document links. The link destination table, as shown in FIG. 9a, that the system created during the tree-building phase makes this possible. When the system encounters a link node, the system resolves the link by finding the row in the link destination table containing the entry for the source electronic document, the link location, and the destination node having the destination identifier.

Other embodiments are within the scope of the following claims. For example, the order of performing steps of the invention may be changed by those skilled in the art and still achieve desirable results. Weighting factors may be changed. Additional steps and additional factors may be added. Steps and factors may also be omitted. Name checking can be extended to include headings with foreign names.

What is claimed is:

1. A computer-implemented method for inferring structure information in an electronic document, comprising:
    identifying a plurality of paragraph types in a source electronic document;
    gathering statistics for the paragraph types in the source electronic document, wherein the statistics are based on a count of paragraph instances having the same one paragraph type assigned, a count of lines of paragraph instances having the same one paragraph type, and a count of batch length of one paragraph type;
    mapping each paragraph type to one of a plurality of structural types; and
    using the statistics for the paragraph types to determine the structural type for one paragraph type.

2. The method of claim 1, wherein mapping one paragraph type to one structural type comprises comparing a name of the one paragraph type to a word connoting one of the plurality of structural types.

3. The method of claim 1, further comprising:
    identifying a plurality of subparagraph types assigned to a plurality of characters in the source electronic document; and
    mapping each subparagraph type to a pre-defined character type by examining a plurality of presentational attributes of the subparagraph type.

4. A computer-implemented method for inferring structure information in an electronic document, comprising:
    identifying a plurality of paragraph types in a source electronic document;
    mapping each paragraph type to one of a plurality of structural types, this mapping comprising:
        examining a paragraph placement for a first one of the paragraph types;
        comparing a count of paragraph instances to which the first one of the paragraph types is assigned to 0 and a count of batches for the first one of the paragraph types to 0 if the paragraph placement is not a side placement;
        examining a first character and a last character of a name of the first one of the paragraph types if the paragraph placement is not a side placement and the count of paragraph instances and the count of batches is 0; and
        comparing the name of the first one of the paragraph types to a word connoting a first one of the structural types if the first character and the last character of the name do not connote first one of the structural types.

5. The method of claim 4, wherein mapping one paragraph type to one structural type further comprises:
    computing a weighting factor if the count of paragraph instances and the count of batches are greater than 0; and
    determining the probability that the name connotes the one structural type by comparing the weighting factor to a predetermined value.

6. The method of claim 5, wherein computing the weighting factor comprises:
    setting the weighting factor to an inverse of an average batch length multiplied by an average number of lines;
    multiplying the weighting factor by 1.5 if the first one of the paragraph types is automatically numbered;
    multiplying the weighting factor by 1.5 if the first one of the paragraph types straddles multiple columns;
    comparing the weighting factor to 0.9; and
    mapping the first one of the paragraph types to a heading if the weighting factor exceeds 0.9.

7. A computer-implemented method for constructing a hierarchical organization of paragraph instances from an unstructured electronic document, comprising:
    assigning one of a plurality of hierarchical levels to one of a plurality of structural types in an unstructured electronic document, wherein this assigning comprises sorting the structural types that are a heading structural type by structural name, assigned font, and indentation specification;
    associating one of a plurality of paragraph instances in the unstructured electronic document with one of the plurality of structural types; and
    constructing a hierarchical organization of paragraph instances using the structural type with which each paragraph instance is associated and the hierarchical level assigned to the structural type.

8. The method of claim 7 wherein sorting by structural name comprises:
    comparing a length of a first structural name to a length of a second structural name;
    comparing a last character in the first structural name and a last character in the second structural name if the first structural name and the second structural name are the same length, end with a number, and have identical characters except the last character; and
    designating a more major heading to the one of the first structural name and the second structural name having a greater last character.

9. A computer-implemented method for constructing a hierarchical organization of paragraph instances from an unstructured electronic document, comprising:
    assigning one of a plurality of hierarchical levels to one of a plurality of structural types in an unstructured electronic document, wherein this assigning comprises sorting each structural type that is a list structural type by structural name and indentation specifications;
    associating one of a plurality of paragraph instances in the unstructured electronic document with one of the plurality of structural types; and constructing a hierarchical organization of paragraph instances using the structural type with which each paragraph instance is associated and the hierarchical level assigned to the structural type.

10. A computer-implemented method for constructing a hierarchical organization of paragraph instances from an unstructured electronic document, comprising:

assigning one of a plurality of hierarchical levels to one of a plurality of structural types in an unstructured electronic document;

associating one of a plurality of paragraph instances in the unstructured electronic document with one of the plurality of structural types; and constructing a hierarchical organization of paragraph instances using the structural type with which each paragraph instance is associated and the hierarchical level assigned to the structural type wherein this constructing comprises:

appending a paragraph instance to a current tier if the hierarchical level of the structural type with which the paragraph instance is associated is equal to 0;

assigning the current tier to a parent level having a lesser tier value if the hierarchical level of the structural type with which the paragraph instance is associated is not 0 and is less than or equal to the current tier, until the hierarchical level of the structural type with which the paragraph instance is associated is greater than the current tier; and generating a section node to begin a new branch of the hierarchical organization if the hierarchical level of the structural type with which the paragraph instance is associated is not 0 and is greater than the current tier.

11. A computer program for constructing a hierarchical organization of paragraph instances from an unstructured electronic document, comprising instructions operable to cause a computer to:

associate one of a plurality of paragraph instances in an unstructured electronic document with one of the plurality of structural types;

assign one of a plurality of hierarchical levels to one of a plurality of structural types; and construct a hierarchical organization of paragraph instances using the structural type with which each paragraph instance is associated and the hierarchical level assigned to the structural type, the instructions to construct a hierarchical organization of paragraph instances comprising instructions to:

append a paragraph instance to a current tier if the hierarchical level of the structural type with which the paragraph instance is associated is equal to 0;

assign the current tier to a parent level having a lesser tier value if the hierarchical level of the structural type with which the paragraph instance is associated is not 0 and is less than or equal to the current tier, until the hierarchical level of the structural type with which the paragraph instance is associated is greater than the current tier; and generate a section node to begin a new branch of the hierarchical organization if the hierarchical level of the structural type with which the paragraph instance is associated is not 0 and is greater than the current tier.

12. A computer program for constructing a hierarchical organization of paragraph instances from an unstructured electronic document, comprising instructions operable to cause a computer to:

associate one of a plurality of paragraph instances in an unstructured electronic document with one of the plurality of structural types; and assign one of a plurality of hierarchical levels to one of a plurality of structural types, the instructions to assign comprising instructions operable to cause a computer to sort the structural types that are a heading structural type by structural name, assigned font, and indentation specification.

13. The product of claim 12, wherein instructions to sort by structural name comprise instructions to:

compare a length of a first structural name to a length of a second structural name;

compare a last character in the first structural name and a last character in the second structural name if the first structural name and the second structural name are the same length, end with a number, and have identical characters except the last character; and designate a more major heading to the one of the first structural name and the second structural name having a greater last character.

14. A computer program for constructing a hierarchical organization of paragraph instances from an unstructured electronic document, comprising instructions operable to cause a computer to:

associate one of a plurality of paragraph instances in an unstructured electronic document with one of the plurality of structural types; and assign one of a plurality of hierarchical levels to one of a plurality of structural types, the instructions to assign comprising instructions operable to cause a computer to sort each structural type that is a list structural type by structural name and indentation specification.

15. A computer program for inferring structure information in an electronic document, comprising instructions operable to cause a computer to:

identify a plurality of paragraph types in a source electronic document;

gather statistics for the paragraph types in the source electronic document, wherein the statistics are based on a count of paragraph instances having the same one paragraph type assigned, a count of lines of paragraph instances having the same one paragraph type, and a count of batch length of one paragraph type;

map each paragraph type to one of a plurality of structural types; and use the statistics for the paragraph types to determine the structural type for one paragraph type.

16. The computer program of claim 15, wherein instructions to map one paragraph type to one structural type comprise instructions to compare a name of the one paragraph type to a word connoting one of the plurality of structural types.

17. The computer program of claim 15, further comprising instructions to:

identify a plurality of subparagraph types assigned to a plurality of characters in the source electronic document; and map each subparagraph type to a pre-defined character type by examining a plurality of presentational attributes of the subparagraph type.

18. A computer program for inferring structure information in an electronic document, comprising instructions operable to cause a computer to:

identify a plurality of paragraph types in a source electronic document;

map each paragraph type to one of a plurality of structural types, the instructions to map comprising instructions to:
  examine a paragraph placement for a first one of the paragraph types;
  compare a count of paragraph instances to which the first one of the paragraph types is assigned to 0 and a count of batches for the first one of the paragraph types to 0 if the paragraph placement is not a side placement;
  examine a first character and a last character of a name of the first one of the paragraph types if the paragraph placement is not a side placement and the count of paragraph instances and the count of batches is 0; and
  compare the name of the first one of the paragraph types to a word connoting a first one of the structural types if the first character and the last character of the name do not connote first one of the structural types.

19. The computer program of claim 18, wherein instructions to map one paragraph type to one structural type comprise instructions to:
  compute a weighting factor if the count of paragraph instances and the count of batches are greater than 0; and
  determine the probability that the name connotes the one structural type by comparing the weighting factor to a pre-determined value.

20. The computer program of claim 19, wherein instructions to compute the weighting factor comprise instructions to:
  set the weighting factor to an inverse of an average batch length multiplied by an average number of lines;
  multiply the weighting factor by 1.5 if the first one of the paragraph types is automatically numbered;
  multiply the weighting factor by 1.5 if the first one of the paragraph types straddles multiple columns;
  compare the weighting factor to 0.9; and
  map the first one of the paragraph types to a heading if the weighting factor exceeds 0.9.

* * * * *

UNITED STATES PATENT AND TRADEMARK OFFICE
CERTIFICATE OF CORRECTION

PATENT NO.    : 6,298,357 B1
DATED         : October 2, 2001
INVENTOR(S)   : Jeffrey C. Young and Michael E. Wexler It is certified that error appears in the above-identified patent and that said Letters Patent is hereby corrected as shown below:

<u>Title page,</u>
Item [56] References Cited, U.S. PATENT DOCUMENTS, please replace "5,781,785 * 4/1999" with --5,781,785 * 7/1998 --.

<u>Column 8,</u>
Line 64, please replace "indentation specifications;" with -- indentation specification; --

Signed and Sealed this

Fourth Day of June, 2002

*Attest:*

*Attesting Officer*

JAMES E. ROGAN
*Director of the United States Patent and Trademark Office*